US006295293B1

United States Patent
Tönnby et al.

(10) Patent No.: US 6,295,293 B1
(45) Date of Patent: Sep. 25, 2001

(54) ACCESS NETWORK OVER A DEDICATED MEDIUM

(75) Inventors: Ingmar Tönnby; Allan Hansson, both of Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 08/868,551

(22) Filed: Jun. 4, 1997

(30) Foreign Application Priority Data

Jun. 4, 1996 (SE) .................................................. 9602212
Nov. 29, 1996 (SE) .................................................. 9604409

(51) Int. Cl.[7] .................................................. H04L 12/28
(52) U.S. Cl. .......................... 370/389; 370/401; 370/351
(58) Field of Search .................................. 370/351, 353, 370/354, 356, 401, 463, 524, 384, 389; 348/12, 13, 15, 17; 455/3.1, 5.1

(56) References Cited

U.S. PATENT DOCUMENTS

| 5,602,846 | * | 2/1997 | Holmquist | 370/384 |
| 5,610,910 | * | 3/1997 | Focsaneanu | 370/351 |
| 5,636,282 | * | 6/1997 | Holmquist | 379/442 |
| 5,675,732 | * | 10/1997 | Majeti | 370/229 |
| 5,708,663 | * | 1/1998 | Wright | 370/524 |
| 5,828,666 | * | 10/1998 | Focsaneanu | 370/389 |
| 5,852,655 | * | 12/1998 | McHale | 379/93.14 |

OTHER PUBLICATIONS

ADSL Forum, General Introduction to Copper Access Technologies (avail. at http://www.adsl.com/general_tutorial.html), pp. 1–7.

* cited by examiner

Primary Examiner—Douglas Olms
Assistant Examiner—Ricardo M. Pizarro
(74) Attorney, Agent, or Firm—Burns, Doane, Swecker & Mathis, L.L.P.

(57) ABSTRACT

A network terminal and an Internet Protocol IP access node in an access network. The network terminal gives instant access to a multitude of communication services such as telephony, video, data, multi media as well as services provided by Internet. In the access network IP is used as an internal multiplexing and transport technique. The speed at which data is transported on the access line is limited by the used modem technique, not by the restrictions posed by the general public switched telephone network. Several terminals may be connected to one and the same access line.

4 Claims, 7 Drawing Sheets

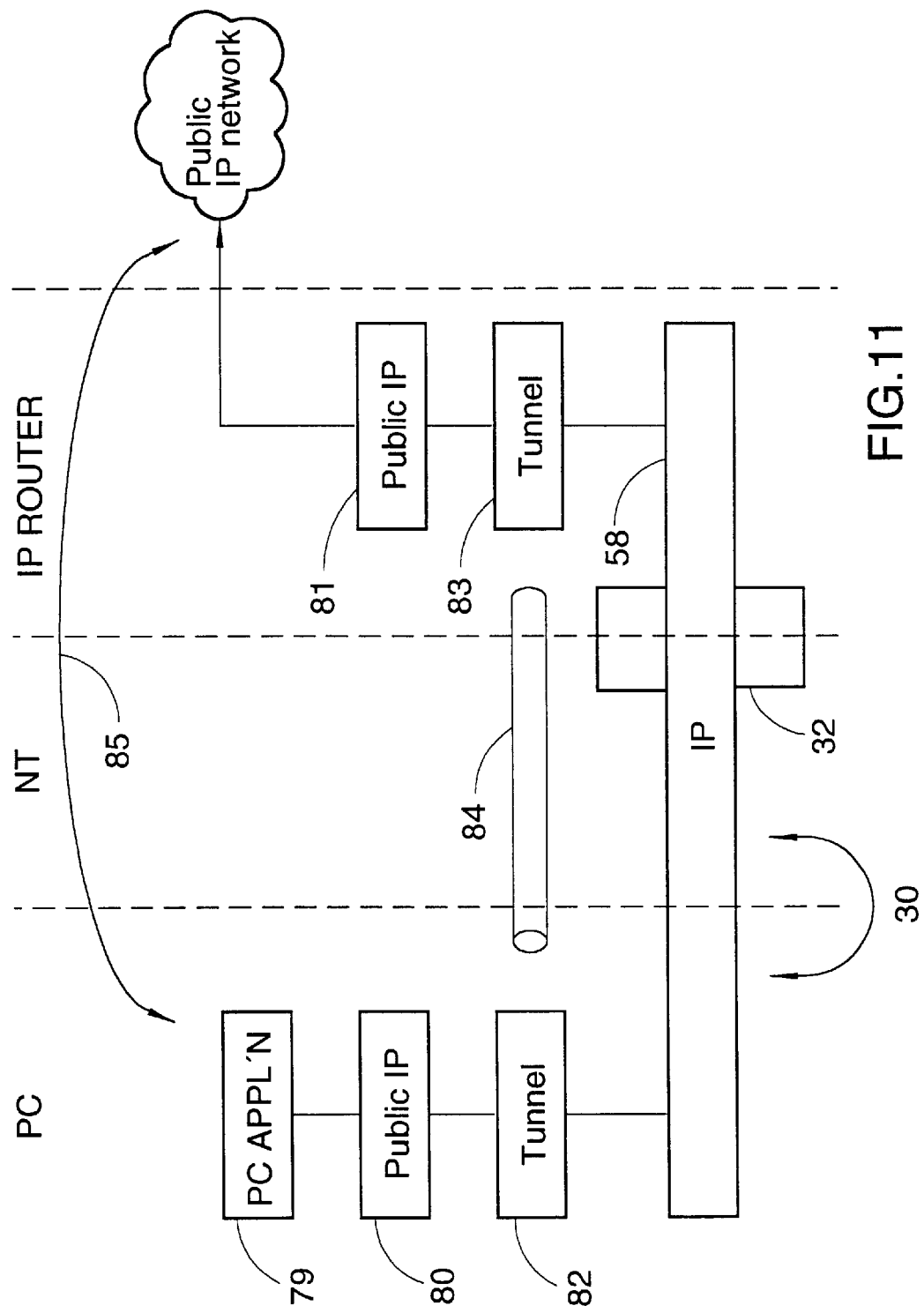

ACCESS NETWORK OVER A DEDICATED MEDIUM

TECHNICAL FIELD

This invention relates to a network terminal and an IP based access network. The network node provides instant access to a multitude of communication services such as telephony, video, data, multi media as well as services provided by Internet. In the access network IP is used as the multiplexing and transport technique. The speed at which data is transported on the access line is limited by the transmission technique used not by the restrictions posed by the general public switched telephone network PSTN.

BACKGROUND

The traditional access to PSTN is a copper wire network with an individual two wire copper line, referred to as access line or subscriber line, for each subscriber. The access line supports 3.1 kHz telephony and is terminated in a local office, or in a remote switch group. As a physical medium the copper pair can support much higher bandwidths, but traditional local offices can only support 64 kb/s, or multiples thereof, stream services. ISDN (Integrated Services Digital Network) is using the same type of copper line, but uses a DSL (Digital Subscriber Line) modulation technique, which provides 144 kb/s (2B+D). However, ISDN requires an entirely new network solution.

The traditional method to access Internet from a subscriber's home is to use a dialed up connection to a modem pool of an Internet server. The connection is set up in the PSTN. Over the connection information is exchanged in IP packets (packets using the Internet Protocol suit). At the subscriber's end of the access line a telephone and a PC (Personal Computer) is connected to a modem. The modem is used to provide for transmission of digital data. Due to restrictions posed by PSTN the bit rates at which the modem can transmit and receive data is limited to about 30 kb/s.

This known method to access Internet is slow, it takes up to 30 seconds to set up the connection. Once the connection is set up, its bandwidth is often utilized very poorly due to the bursty nature of the IP traffic. Also the transmission of large amounts of data, in particular graphic information such as a WWW page, is slow due to the limited bandwidth provided by the modem to modem connection on top of the digital 64 kb/s connection. Further, when the connection has been set up no incoming calls can be received and no outgoing calls can be placed.

From a network point of view the above method to access Internet has a serious problem. The PSTN network has been dimensioned by assuming certain characteristics of the traffic, among other things a certain mean value of the traffic on subscriber/access lines, and a certain mean value of the duration of calls. PSTN is a concentrating network, and the number of outgoing trunks from a local office may be as low as one fourth of the subscriber/access lines. Internet access via dialed up modem connections usually have a quite different traffic pattern. For example the duration of calls are much longer than the mean value for ordinary telephone calls, a fact that would call for redimensioning of the switched telephone network if Internet access over PSTN becomes very frequent.

Subscribers which have been provided ISDN can access Internet over one or two B-channels. If one B-channel is used for Internet access, the subscriber can still receive incoming telephone calls on the other. This known access method, however, has the same negative consequences for the network dimensioning as the dialed up modem method.

There is a rapid development on the copper access technology field. Compare ADSL Forum, General Introduction to Copper Access Technologies (Available at http://www.adsl.com/general_13tutorial.html). A number of different modem technologies are being developed, such as VDSL (Very high bit rate Digital Subscriber Line) which provides 20 Mb/s in both directions over a copper pair up to a copper pair length of a few hundred meters. ADSL (Asymmetric Digital Subscriber Line) provides 1,5–9 Mb/s downstream and at least 16–640 kb/s upstream depending on the length of the copper pair length. However these technologies assume that the PSTN access should be provided as before and that a frequency band above the one used for PSTN access shall be used for data communication.

The recent development of the PSTN (ISDN) access network includes the standard interfaces V5.1 and V5.2 between local offices and access networks. These standards permit the introduction of access nodes which are connected to the local office.

Access nodes can also be connected to PSTN by a digital PABX (Private Automatic Branch Exchange) interface and to ISDN by a PRI (Primary Rate Interface). The V5 interfaces, the PRI interface and the PABX interface provide only 64 Kb/s bearer services and multiples thereof.

A previously known technique which permits simultaneously an Internet session and a telephony session over the same telephone access line includes a DSVD modem. (Digital Simultaneous transmission of Voice and Data on a single line).

A new technique that for simultaneously an Internet session and a telephony session over the same telephone access line includes a telephone doubler arrangement described in FIG. 1 below and in Swedish Patent Application No. 9602212-4.

The telephone doubler arrangement permits a user which is connected to an analogue telephone network to access an IP-based communication service and still be able to receive and answer incoming calls, and to place outgoing calls, while simultaneously surfing the Internet.

In FIG. 1 the telephone doubler arrangement 1 is shown to be connected to PSTN 2 and to Internet 3. At the user side a modem 4 is connected to PSTN 2, to a standard analogue telephone 5 and to a PC 6. The telephone doubler arrangement 1 comprises a modem pool 7 connected to PSTN 2, to Internet 3 and to a telephony server 9. The telephony server 9 is connected to PSTN 2.

When a user A is connected to Internet 3 via a dialed up PSTN connection to the modem pool 7 the telephone 5 cannot be used. On his/her PC the user can still communicate with other PSTN users by using the connectivity and multiplexing capabilities of IP. The dialed up line can carry a multiplexed stream of IP packages of: (a) an Internet session and (b) a telephony call. Speech carrying IP packages are routed to/from the telephony server 9 to PSTN. Telephony control signals are exchanged between the telephony server 9 and a telephony application 10 which runs on the PC. If the PC has audio capabilities, symbolized by a headset 11 comprising earphones and a microphone, a user A can be engaged in speech conversations with other users connected to the PSTN or ISDN. The user has got a new, soft phone on the PC 6.

Another new technique that allows for simultaneously an Internet session and a telephony session over the same telephone access line makes use of the telephone doubler principle described above complemented, at the user end, with an IP modem 12 as shown in FIG. 2 and in Swedish Patent Application No. 9604409-4. IP functionality, such as provided by the PC 6 in FIG. 1, has been integrated in the modem 12 and therefore the modem is referred to as an IP modem.

This arrangement makes possible a dialed up connection, using a standard analog telephone, or a telephony application on a PC, while simultaneously an Internet user is engaged in an Internet session over a PC connected to the same IP modem.

The arrangement shown in FIG. 2 is similar to that of FIG. 1. A telephone doubler arrangement 1 is connected to PSTN and Internet and comprises the same units as in FIG. 1.

Over a first IP link 13 between the IP modem and Internet 3 IP packets containing information relating to an Internet session are transported. Part of this link comprises a subscriber line 14 extending between the IP modem and PSTN. Over a second IP link 15 IP packets carrying digitized, compressed speech are transported to/from the telephony server and the modem pool. The telephony server creates a dynamic relation between the IP address of the IP modem and the telephone number of user A. Using the call forwarding service in PSTN incoming calls to user A are redirected to the telephony server.

The arrangement will allow user A to take and to place telephone calls using the ordinary telephone while there is an ongoing Internet session on the personal computer. Also a "soft phone" like the one in Swedish Appl. No. 9602212-4 is provided. Since the modem has IP capabilities it will be possible to communicate with other devices, such as an electricity consumption meter and similar devices, over a home network.

The IP modem is shown in FIG. 3 comprises a subscriber line interface 16, one or more telephone interfaces 17, 18, at least one PC interface 19 and, optionally, a LAN interface 20. There is also an IP multiplexor/demultiplexor 21 and a controller 22. An optional application 23 can run in the IP modem, such as for example an e-mail poller for polling electronic mail-boxes of user A. The IP multiplexor/demultiplexor routes IP packets from the subscriber line interface to their destinations; the PC, the telephone or the LAN. The controller provides control over the functionalities of the IP modem.

The Swedish patent applications cited above both provide telephony access and IP traffic can be superimposed the telephony access.

There are a number of problems related to access of traditional telephony and Internet over a traditional copper access line:

Neither the telephone doubler arrangement nor the DSVD modem solves the problem with the low utilization of a switched connection used as an access to Internet . Nor is the problem with many long-lasting Internet session over switched connections, which gives the PSTN network congestion, addressed.

Bandwidths above 64 kb/s on an analogue access line cannot be handled by traditional access methods. The V5 interface between local offices and access networks, and the PABX/PRI interfaces can only handle 64 kb/s channels. The use of the available bandwidth is bad since the multiplexing capabilities of IP cannot be used.

The telephone doubler arrangement and the DSVD modem requires speech compression on the access line, which introduces delays. Provided fax support is present in the telephone server the telephone doubler arrangement can be used to transfer fax messages.

SUMMARY

The purpose of the present invention is to solve the problem with the low utilization of the available bandwidth of the non-concentrated IP traffic in the PSTN, without adapting PSTN to the characteristics of the Internet access traffic.

Another purpose of the invention is to make it possible to connect more than one terminal to an access line, such as telephones and personal computers, and to support several simultaneous communication sessions.

Another purpose of the invention is to allow a user to have access to several networks operated by different PSTN network operators.

Another purpose of the invention is to allow a user to have access to several networks operated by different IP network operators.

In accordance with the invention it is proposed that the IP access traffic should not use switched PSTN connections.

In accordance with the invention IP is used as transport protocol in the access network.

In accordance with the present invention access to the telephony networks and to the IP networks is provided over an IP network. The access to the IP networks is "always on".

Compared to the telephone doubler arrangement no modem pool is provided. Instead each subscriber line is terminated by an xDSL modem. Further, the bandwidth of the subscriber line will no longer be limited to the bandwidth of a switched connection/dialed up connection. Instead access line protocols such as xDSL, where xDSL is DSL, HDSL, SDSL, VDSL, ADSL or any future digital subscriber line protocol providing high bit-rates, can be used to digitize the access line. Speech compression is no longer required. Modems supporting a xDSL protocol can be used in the access line. Voice grade modems are not required in the access network.

BRIEF DESCRIPTION OF THE DRAWINGS

FIG. 10 is illustrating different protocol stacks used for voice traffic in the network terminal and in the access node and FIG. 11 is illustrating different protocol stacks used for IP traffic between a PC and Internet.

DETAILED DESCRIPTION OF EMBODIMENTS

Figure 1:
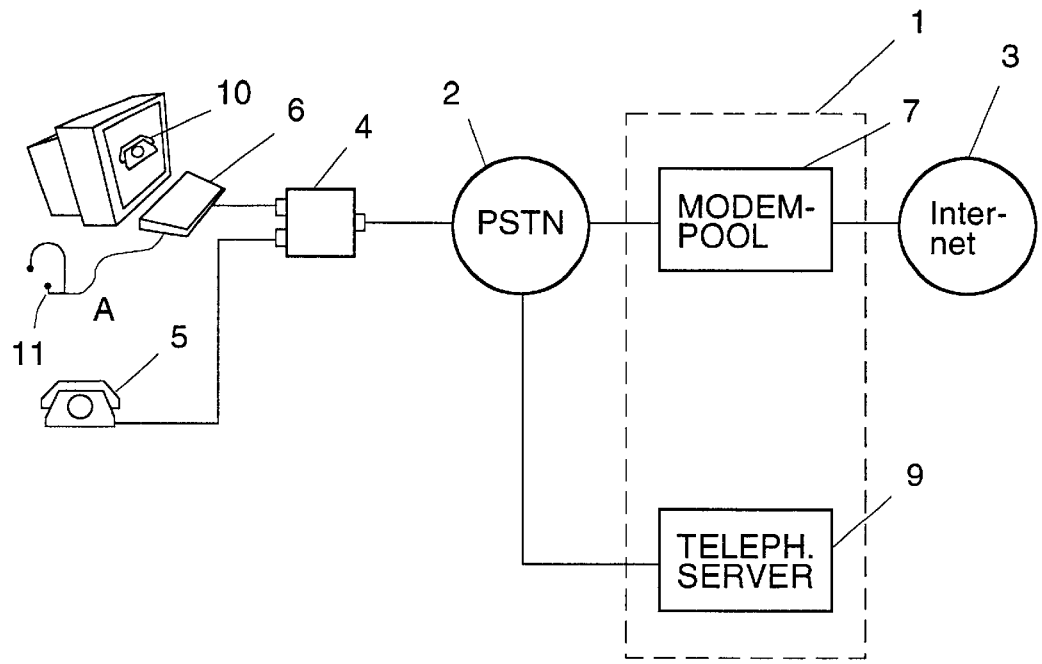
FIG. 1 is a block diagram of a telephone doubler arrangement.
Figure 2:
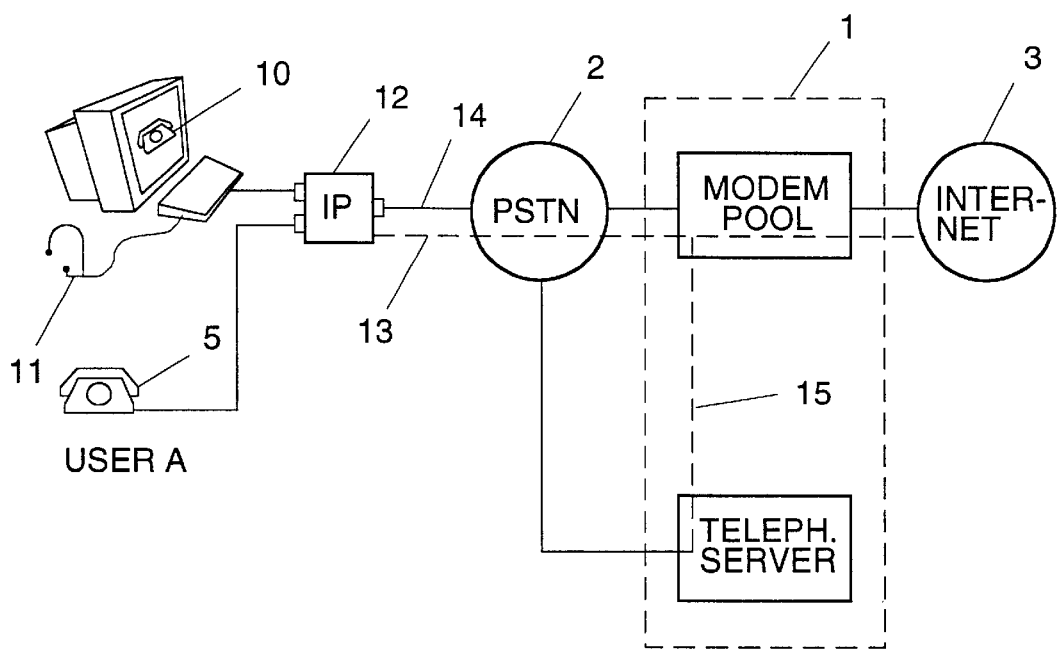
FIG. 2 is a block diagram of an IP modem in a telephone doubler arrangement.
Figure 3:
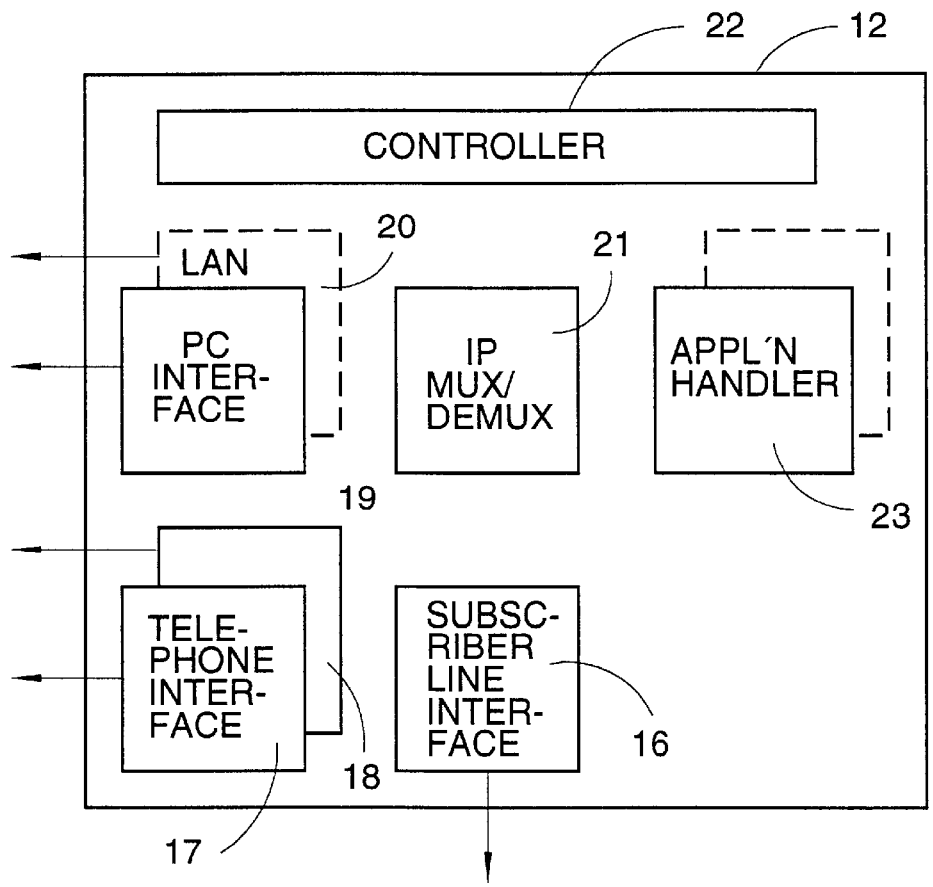
FIG. 3 is a block diagram of an IP modem.
Figure 4:
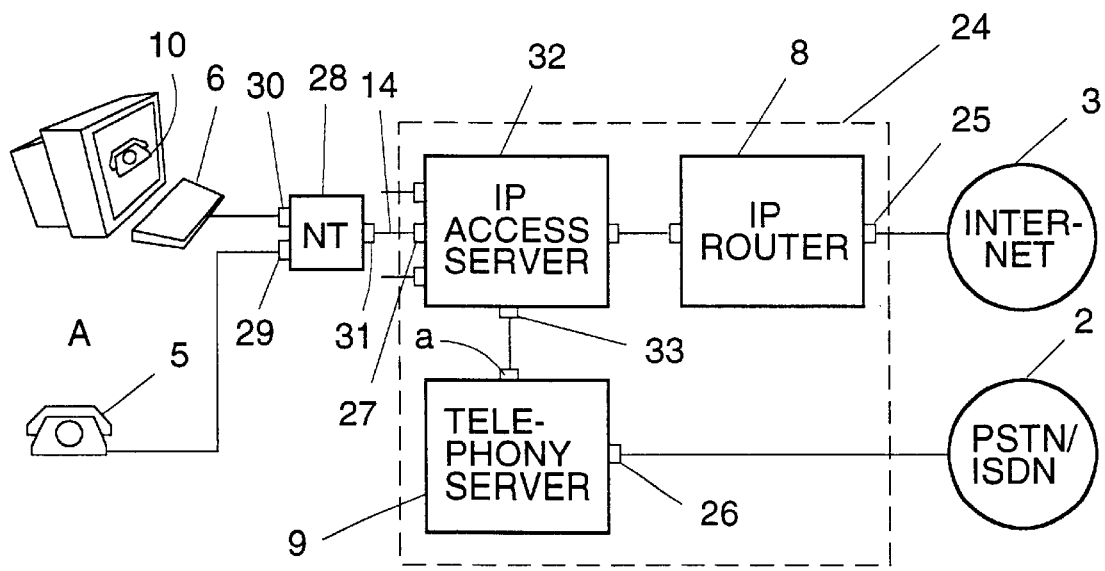
FIG. 4 is a block diagram of an IP-based access node in an remote switch group arrangement.

In FIG. 4 an IP access node 24 is connected to Internet 3 at an interface 25, to PSTN/ISDN 2 at an interface 26 and to the subscriber or access line 14 at an access line interface 27. With the terminology used here the expression of interface refers to a unit or group of units which handles/handle a protocol or a protocol stack. User A has his/her telephone 5 connected to a network terminal (NT) 28 at a first telephone line interface 29. User a has a personal computer (PC) connected to the network terminal at a PC interface 30.

The PC can also be connected to the network terminal via a home LAN network described below.

The NT has also a subscriber line interface 31. The IP access node comprises an IP access server 32, the IP router 8 and the telephony server 9. The access line interface 27 belongs to the IP access server. The IP access server comprises a set of individual xDSL modems. The IP access server has also a telephony server interface 33. Over this interface IP packages containing telephony information are routed to and from the telephony server. Units 32, 9, 8 and 28 communicate with each other using IP packets belonging to an access network internal address space.

The PSTN interface may be a V5.2 interface.

The network terminal supports IP and is functionally similar to the IP modem described above and in the latter Swedish application cited above except that instead of a voice grade modem a modem is used that supports a stream service of a high bit rate, for example any of the above mentioned xDSL protocols.

There will be an "always on" IP connection between user A's network terminal and the IP access server. This will eliminate the above mentioned problem with long duration and low utilization of the available bandwidth of dialed up Internet access over PSTN. The Internet access traffic will not enter PSTN and the risk of congestion in PSTN is non-existent. In the access network the multiplexing ability of the IP protocol can be used and the IP traffic can be concentrated very early.

With the network terminal and IP based access node the bit stream service over the subscriber line is not restricted by the PSTN. Instead it is the used transmission technique and the length of the subscriber line that puts restrictions on the attainable bit rates. The shorter the length the higher is the attainable bit rate.

Based on IP as a multiplexing technique on the subscriber line speech as well as data are transported in IP packages in the subscriber line. Since the available band width is much greater than what is needed for transferring the speech of a telephone call, speech need not be compressed.

In FIG. 4 only one network terminal is shown connected to the IP access server. In practice many different network terminals, associated with many different users, are connected to the IP access server. In this case the IP access server has as many access line interfaces as there are network terminals connected to it. This has been indicated with the unnumbered interface symbols in the IP access server Addressing Scheme As will be described below in connection with FIG. 7 user A may have access to networks of several Internet operators Internet-OP1, Internet-OP2 and to networks of several PSTN operators PSTN-OP1, PSTN-OP2. Further, user A's network terminal may be provided with a second telephony interface 34 and an additional terminal equipment interface 35 to which a home LAN or a second PC may be connected.

The way the various devices and interfaces are addressed will next be described with reference to FIG. 7.

Address Mapping and Routing

Address mapping plays an important role in the present invention. The arrangement with several different service providers of each type of service network give rise to several address spaces, which therefore are not possible to use as internal addresses.

An IP address is a reference to an interface and a port behind that interface. Usually, a port designates an application.

Figure 10:
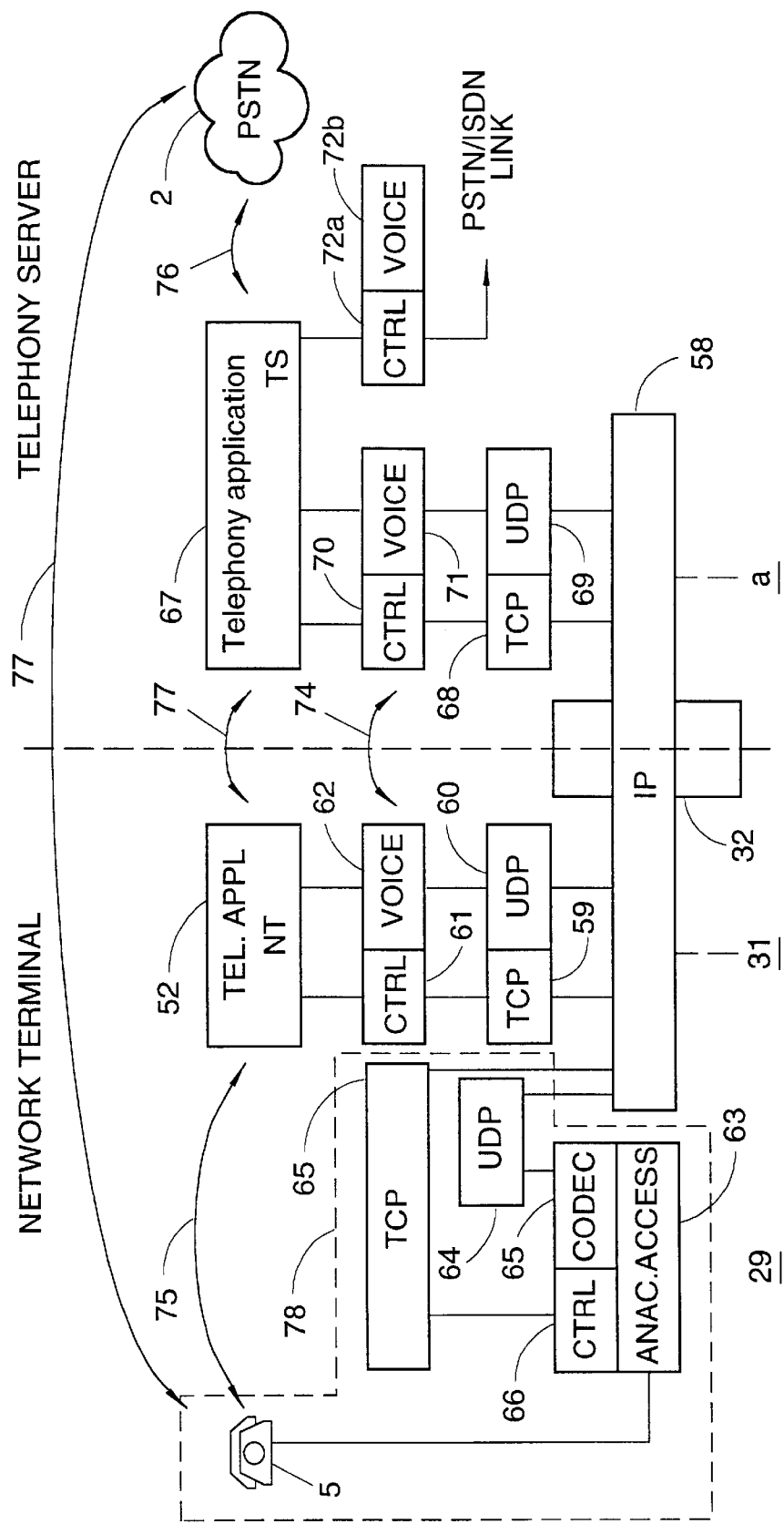

A network terminal 28 has an internal IP address (internal refers to the access network, i.e. the IP address is not known outside of the access network). Further, a number of ports, each one attached e.g. to an application (residing in the NT), which can be reached over IP, are defined for an NT 28. E.g., a telephony application 52, shown in the network terminal in FIG. 10 is addressed by the IP address of the NT 28, and a unique port number. The different accesses, which supports a single device (e.g. a serial port or an analogue telephone access) are seen as applications, and are thus addressed by port numbers. Devices connected to a LAN have their own internal IP address. If they want to communicate over an external IP network, such as Internet 3, they have to have an external IP address as well.

A telephony number, which is associated to a subscription of a telephony service, is associated to one or more devices (attached to an NT 28) with capabilities to handle telephony. Such devices can be e.g. analogue or digital telephones.

Within the access network, e.g. in case of an incoming call to this destination, it is sufficient to be able to address the NT 28 and the telephone application 52. This is done by mapping the external telephone number (or a representation of it) on the internal address of the NT 28, and the port number of the telephony application 52. By information carried over the application protocol, the telephony application 52 knows the destination of the call. The telephony application 52 holds information of which telephone interfaces are involved in the destination.

The telephony application 52 in an NT 28 communicates with a telephony application 67 in the telephony server 9, which has a similar address (IP address of the telephony server 9 including a port address. The telephony application 67 in the telephony server 9 can in its turn address the proper interface of a wanted telephony network such as 45 or 46 in FIG. 7.

In case of communication with an external IP network, such as Internet, a tunnelling technique can be used. There are several ways to handle this. Refer to FIG. 11. We assume that a tunnel 84 extends between the PC 6 and the IP router 8, which handles the interfaces to the external networks 42, 43 shown in FIG. 7. All packets travelling a tunnel towards the IP router 8 are destined to the same external IP network, for example the external IP network 43. The PC 6 has an internal IP address and an external IP address.

In that case, an IP packet, which arrives to the IP router 8 from an external IP network, and which is addressed to an application on the PC 6 (by an external IP address with a port number), is handled in the following way. The external IP address is mapped on the internal IP address of the PC 6, including a port number referring to an application which handles the tunnelling protocol. The IP packet is then put in a new IP envelope with the internal IP address, and routed over the access network to the destination PC 6.

An IP packet, which is sent from a PC 6 to an external address, is tunnelled in the same way by an internal IP address, which points out an application handling the tunnelling protocols. The tunnel identity points out which interface the packet is aimed for.

Before the NT 28 is used for traffic purposes it has to be configured, e.g. in order to support the address mapping. The NT is supplied with an internal address of the router 8 and/or telephony server 9 and with data related to the requested use of the access possibilities, i.e. the NT configuration. Such configuration possibilities are discussed further below. When the NT 5 subsequently is installed in the access network, the IP router 8 and the telephony server 9 have to be informed. Accordingly, the telephony server 9 is informed about its existence and associated internal IP addresses, the port number of the telephony application of the NT 28 and the corresponding telephone number or numbers or equivalent, e.g. port number in the telephony server. Similarly, the IP router 8 is informed about the internal IP address and the port number of the IP application of the NT 28 and the corresponding external IP address or addresses. In cases where tunnelling protocols are used, the internal address of the PC has to be known. The NT 28 has to be configured accordingly. E.g., a telephone number is related to a number of interfaces.

Incoming Traffic to the NT

Refer to FIG. 4. An incoming telephone call to destination A is received by the PSTN interface of the telephony server. The telephony server digitizes the incoming speech, packetizes the digitized speech in packets, provides it with a call identifier and finally puts it into IP packets, provides the IP packets with the internal IP address of the NT and the port number of the telephony application 52 shown in FIG. 10. The IP packets are sent to the IP access server which forward them to the NT. The NT examines the destination of the IP packets, in this case the telephony application 52, which forwards them to the telephone interface where they are unpacked and subjected to a D/A conversion. Analogue voice signals are generated and sent to the telephone.

Control signaling associated with the incoming call will be described in connection with FIG. 10.

If there is incoming IP traffic to the PC or to any other device connected to the network terminal or to an application in the network terminal the IP packets from Internet will arrive to the IP router which examines the external IP address, examines its mapping table and identifies the internal addresses to which the IP packets shall be forwarded. Next the IP router sends the IP packets to the destination NT via the IP access server. The NT in its turn examines the external IP address and forwards the IP packets to their corresponding interface, in this case the PC interface.

If there is an incoming telephone call from PSTN simultaneously with incoming IP packets from Internet the IP packets from the two sources are multiplexed in the IP access server from which they are transported over the subscriber line to the network terminal. The network terminal demultiplexes the IP packets and sends the demultiplexed IP packets to their respective destinations.

Outgoing Traffic from the NT

Control signaling for outgoing telephony traffic will be described in connection with FIG. 11.

Refer to FIG. 4. Speech from the telephone in the outgoing direction is subjected to an A/D conversion in the NT. The NT will packetize the digitized speech, supply a call identity, put it in IP packets and provide the IP packets with the internal address of the telephony server. The IP packets are received by the IP access server which examines their destination and sends them to the telephony server where they are depacketized and subjected to an D/A conversion. The result is an analogue voice signal that is sent to PSTN on the proper channel.

A telephone can have several external addresses.

Outgoing IP packets from the NT are marked with the internal address of the telephony server and its telephony application in case a telephone call is considered or with the internal address of the IP router in case an Internet session is considered. The IP access server will examine the internal addresses of the IP packets and route them accordingly. If they are routed to the IP router the IP router will examine e.g. tunnel identity and forward them towards their destination. If they are routed to the telephony server, the telephony server will examine their call identity and, after depacketizing and D/A conversion, route the speech to the proper PSTN connection.

Simultaneously with a telephone conversation the network terminal may have an ongoing session with Internet. As will be explained later the network terminal has an IP multiplexor/demultiplexor with routing capabilities. This device multiplexes information from different applications and/or terminal onto one and the same PPP connection to the IP access server and that demultiplexes received IP packets and forwards the IP packets to the respective destinations. The network terminal may forward incoming IP packets from the Internet to an application, non shown, running on the PC and will forward incoming IP packets containing telephony speech information to the telephony application.

In FIG. 4 user A can use the Internet phone service, i.e. exchange speech information with other users connected to Internet, from the ordinary telephone.

The NT

Before the network terminal is used for traffic purposes it is configured with the internal IP addresses to the IP access server, to the IP router and to the telephony server. It is also configured with user data relating to user A. As an example user data comprises the IP access user name of user A and a password.

When the network terminal is activated IP functionality residing therein is activated. In particular an xDSL connection with an overlying PPP (point to point protocol) link is established between the network terminal and the IP access server. This connection is "always on". Over the PPP link the network terminal registers itself at the IP access server and the IP access server is now able to route IP messages, which as destination have the internal IP address of the network terminal, to the network terminal. Simultaneously the network terminal is registered at the telephony server.

The IP Access Server

The IP access server comprises means for terminating the transmission protocol used on the subscriber line, for example a xDSL modem. It also comprises means for terminating the link protocol between the NT to the IP access server. It also comprises means for terminating the link protocol over the link between the IP access server and the IP router. The IP access server, further to its multiplexing/demultiplexing functionality as given by the IP protocol, has also a routing functionality by means of which IP packets containing telephony information (speech and control signals) are directed to/from the telephony server in accordance with their internal address and IP packets containing Internet information are directed to/from the IP router in accordance with their internal address.

The IP access server typically serves some hundreds network terminals.

The IP access server has physical connections with the telephony server e.g. over a LAN, not shown in the drawings. These connections are permanent, i.e. they are not established on a per call basis. Over these connections speech is transported using the IP protocol.

IP Router

The IP router comprises an IP application which handles the relations between external IP addresses or equivalents and the internal IP addresses and port numbers for IP applications.

The IP router has an IP application.

The Telephony Server

The telephony server comprises a central controller, a PSTN access handler, an IP packetizing/depacketizing unit, an IP handler and an address mapping unit. Under control from the central controller the access handler receives incoming calls and places outgoing calls, maps the external PSTN addresses on internal addresses of user A's telephone and provides connections to the IP access server. The PSTN access handler converts received speech containing IP packets from the NT into isochronous speech signals which are sent to the PSTN, and the reversed procedure for speech signals from the PSTN.

Figure 5:
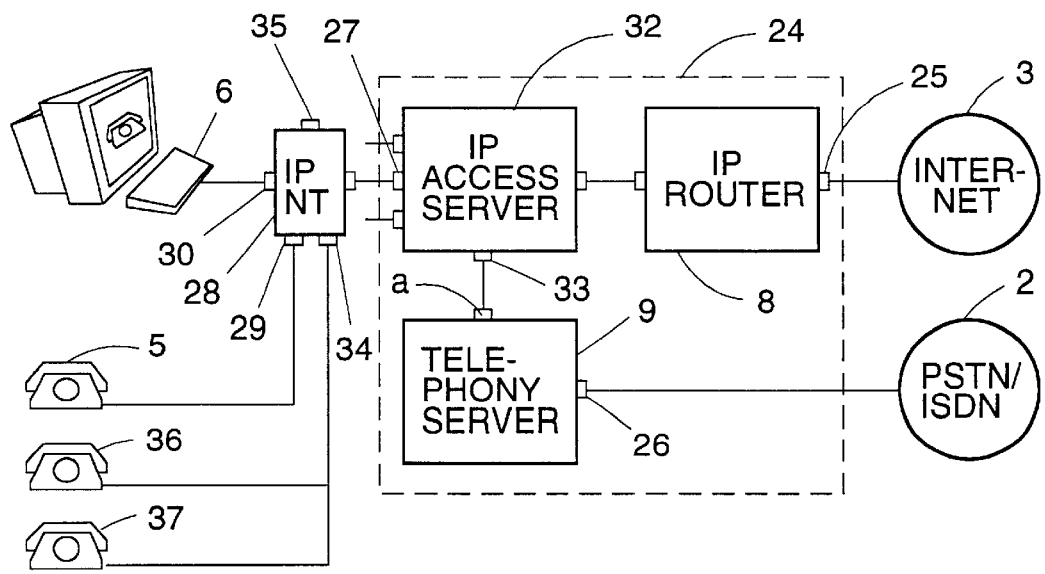
FIG. 5 is a block diagram similar to FIG. 4.

In FIG. 5 the network terminal is provided with a second telephony interface 34 and an additional terminal equipment interface 35. To the second telephony interface additional telephones 36 and 37 are connected. To the additional terminal equipment interface an additional PC or a LAN (Local Area Network) may be connected. The second telephone interface is given an external PSTN address and an internal address.

As explained in connection with FIG. 4 a telephone can have several external addresses. An external address can be related to several telephones.

The additional terminal equipment interface are given an external IP address and an internal address. The internal IP addresses are communicated to the IP access server, the IP router and the telephony server. In the telephony server the new external PSTN address is mapped on the IP addresses of the network terminal. In the network terminal the new external PSTN address is mapped on the second telephony interface. In the IP router the new external IP address is mapped on the terminal equipment interface. In the network terminal the new external IP address is mapped on the terminal equipment interface.

The network terminal provides internal communication between telephones 5, 36 and 37. Each of the telephone interfaces of the NT is used by a telephony application running in the network terminal and shown in FIG. 10. The telephony application must know the external and internal addresses of the first and second telephony interfaces. The telephone connected to the first telephone interface can communicate with the telephones connected to the second telephone interface and vice versa. In this way intercom is provided by the network terminal. Moreover, the telephony application running on the PC can communicate with any of the two telephone interfaces via the network terminal. In the preferred embodiment the telephone application is designed to send ringing signals to telephone 5 when there is an incoming call which as destination uses the external PSTN address associated with the first telephone interface and to send ringing signals to telephones 36, 37 when there is an incoming call which as destination uses the external PSTN address associated with the second telephone interface.

In the case several network terminals are connected to one and the same IP access server it will be possible to make telephone calls between telephone devices connected to different network terminals via the telephony application in the telephony server. In this case no connections are set up in the PSTN.

If a LAN is connected to the terminal equipment interface an IP application running in the network terminal can serve as a simple router of a home LAN to which different devices are connected, each such device supporting the TCP/IP protocol. Examples of such devices are an electricity consumption meter, an water consumption meter, a burglar alarm, an electrical heating radiator and similar devices.

If an additional PC is connected to the terminal equipment interface 35 this PC can communicate with the PC 6 via the network terminal.

Network Architecture

In FIGS. 4 and 5 the IP router is shown connected to the IP access server with a line. Also the IP access server is shown to be connected to the telephony server with a line. In practice each one of said lines represents either a line or a network structure.

The IP access server, the IP router, the telephony server may be interconnected by a LAN.

Figure 6:
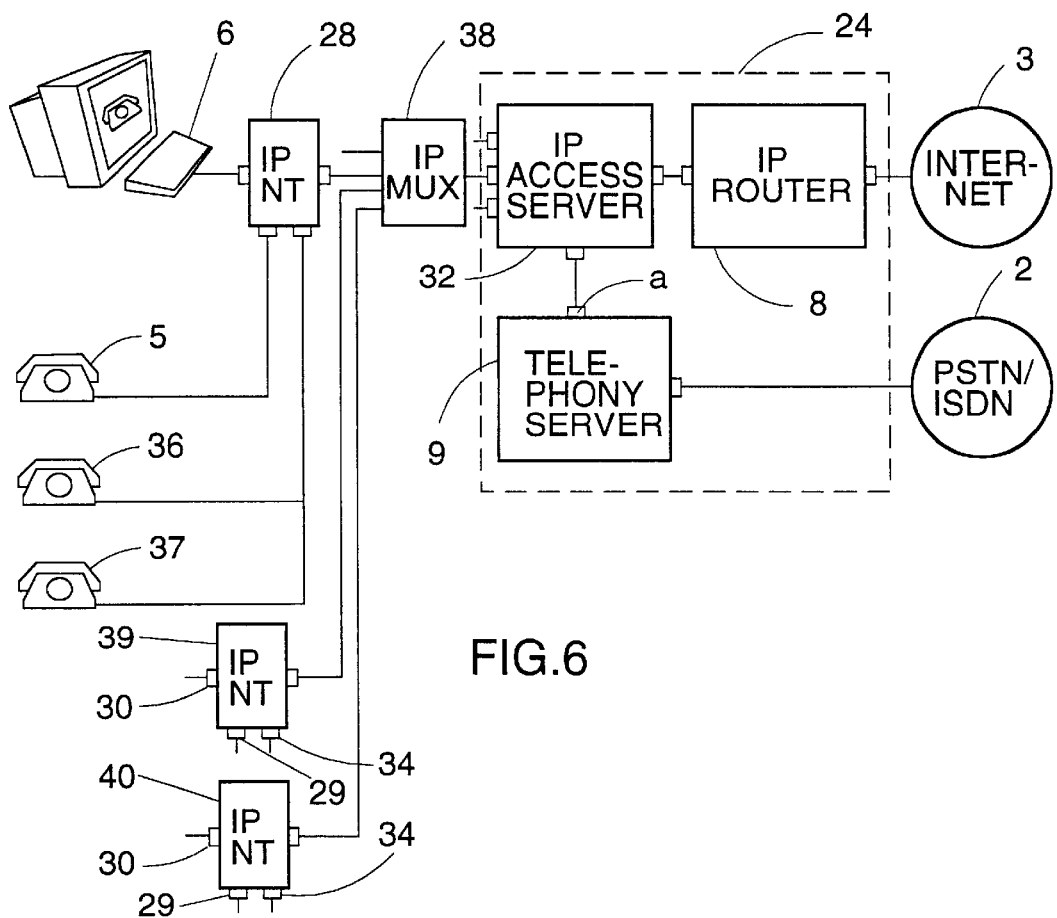
FIG. 6 is a block diagram similar to FIG. 4 allowing access to several Internet, Intranet and PSTN operators.

In FIG. 6 an IP multiplexor 38 is connected between the IP access node the network terminal 28 and a number of additional network terminals 39, 40. Network terminal 39 is similar to network terminal 28 and is used by another user B. Network terminal 30 is also similar to network terminal 28 and is used by still another user D. By including the IP multiplexor close to the network terminals the distances over which twisted two copper wires run are reduced and VDSL can be used as transmission protocol between the network terminals and the IP multiplexor. Between the IP multiplexor and IP access server either optical fibers or a transmission technology using several wire pairs can be used.

Each additional network terminal and its associated interfaces has been given external and internal addresses in the manner described for network terminal 28. Internal IP addresses are known to the IP access server, the IP router and possibly the telephony server. Also the IP router has performed the mentioned mapping of their IP external addresses on their internal addresses. Typically the IP access server will serve some hundreds of network terminals.

In FIG. 6 the access network comprises the network terminals, the IP multiplexor and the IP access node. Within this access network users A, B and C may communicate via the telephony server without using PSTN or the Internet. When user A wants to make a call to user B he/she dials the telephony number of user B. When the digits are received by the telephony server they are recognized, in the mapping table of the telephony server, as an destination within the access network. The call is then forwarded to user B without passing the public PSTN network.

In FIG. 6 the IP access server is shown connected to one IP multiplexor. It can also be connected to further IP multiplexors and/or to further network terminals at the shown, unnumbered interfaces.

Figure 7:
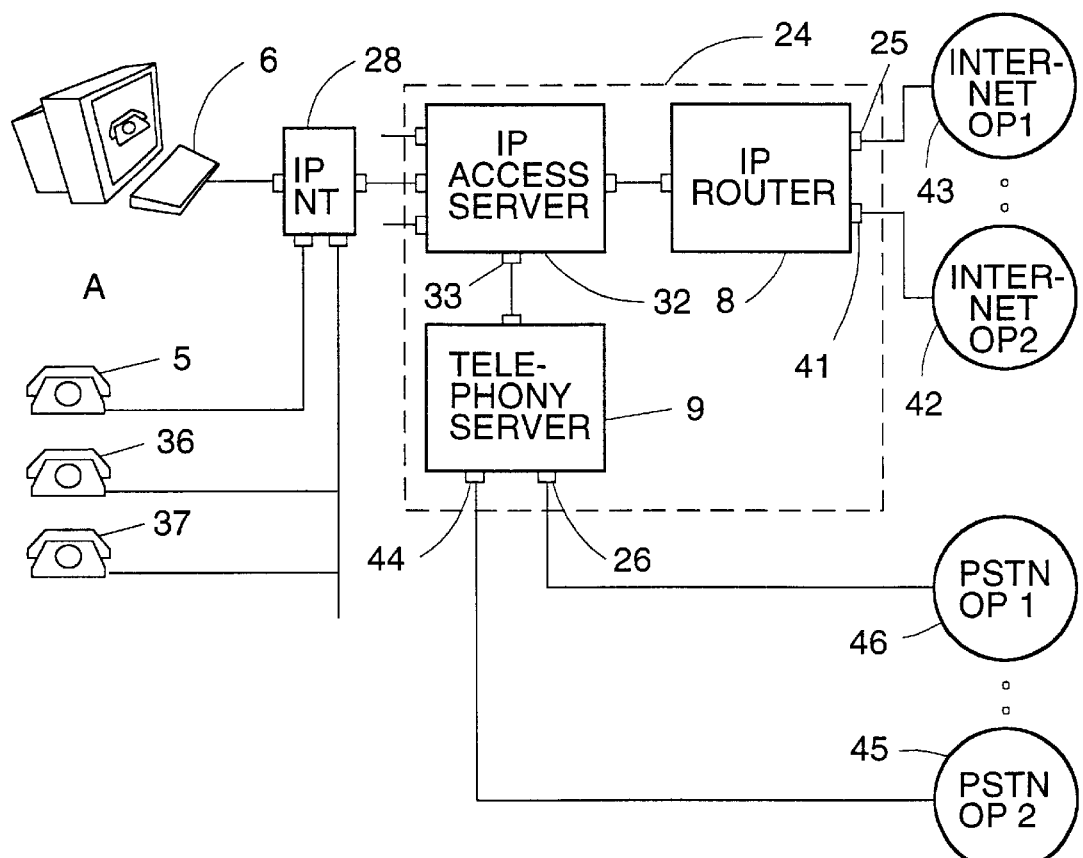
FIG. 7 is a block diagram of an IP bases access node in a remote switched group arrangement connected to an IP multiplexor.

FIG. 7 is similar to FIG. 5 with the exception that the IP router has an additional interface 41 connected to a part 42 of the Internet that is operated by a network operator OP2 different from a network operator OP1 that operates another part 43 of Internet. Also the telephony server has an additional PSTN interface 44 to a part 45 of the PSTN which is operated by a PSTN network operator OP2 different from a PSTN operator OP1 that operates another part 46 of the PSTN. User A now has a possibility to select which network operator to use for an Internet session and for a telephone call respectively.

Above it was explained that a user has a possibility to select which network operator to use for an Internet session and for a telephone call respectively. The choice can be made in two ways. One way is to configure the IP router and the telephony server respectively with information which service provider should be used for user A. When user A dials an external PSTN address the PSTN interface corresponding to the stored information is selected by the telephony server. A similar procedure is applied when an Internet session is started at user A's PC. A second way to select network operator is to make the selection each time an Internet session is started and each time a call is placed respectively. User A then provides the external IP address, or a code representing it. Such code is easily integrated, for instance in the dialed telephone number. As an example user A dials the following sequence 123456*1 when user A want to make a call to the telephone number 123456 in the PSTN network part 46 operated by operator 1 and the telephone number 234567*2 in the PSTN network part 45 operated by operator OP2. A similar procedure is applied when an Internet session is started at user A's PC.

By way of an example an Internet application can support selection of an Internet operator OP1. Still another possibility to select network operator is to include at least a part of the selection procedure in user A's network terminal. The selection can then be performed automatically and the network operator is selected based on different parameters such as the time of the day, the day of the week, long vs. short distance call.

Figure 8:
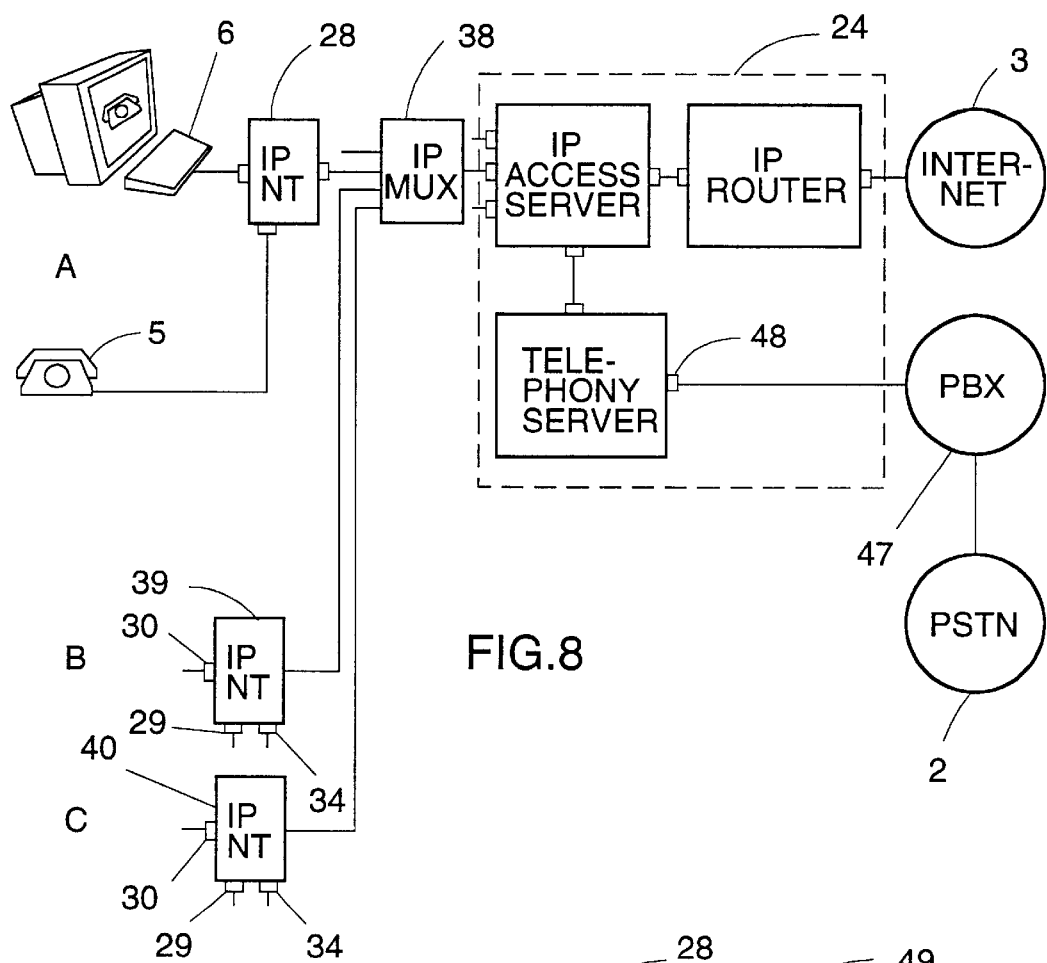
FIG. 8 is an IP based access node in a PBX arrangement.

In FIG. 8 the IP access node is located in an access network of a company and is localized near a private branch exchange PBX 47. In this case the telephony server has a PBX interface 48. User A, B, C in this case have a respective network terminal. Telephones connected to the telephony interfaces 29 of the respective network terminals form extensions of the PBX. The PBX has its own address space formed by the extension numbers. The external PBX extension numbers are handled in the same way as public telephone numbers.

Figure 9:
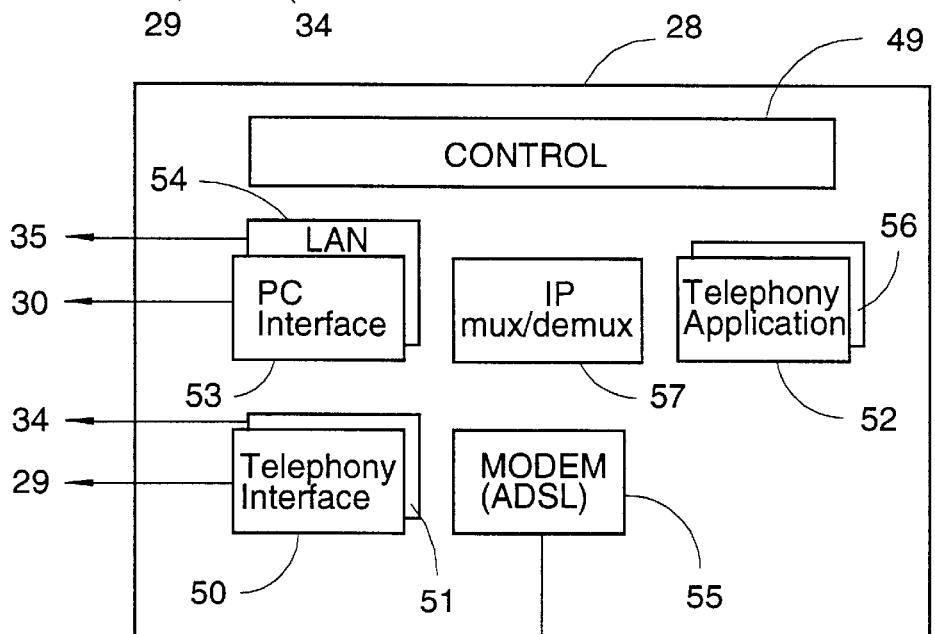
FIG. 9 is a block diagram of a network terminal in accordance with the invention.

In FIG. 9 a block diagram illustrating the various functionalities provided by the network terminal is shown. There is a device control functionality 49 which controls the various function blocks shown below it. There are two telephone interface functionalities 50, 51 for the telephone interfaces 29 and 34. Each telephone interface functionality provides an ordinary analogue interface with capabilities to detect control signals from the telephone, such as off-hook, on-hook, hook flash, DTMF signals. Each telephone interface also generates ring signals and tone signals. Further, each telephone interface converts analogue speech into a digital speech which then is put into outgoing IP packets. Incoming IP packets which carry speech from PSTN are processed the reversed way, i.e. are converted from digital form into analogue speech.

There is also a PC interface functionality for the PC interface 30 and an LAN interface functionality 54 for the terminal equipment interface 35. Both of these interfaces support exchange of IP packets. Each interface is using the IP and the PPP protocols as will be described further down. As described in connection with FIG. 4 several PCs can be connected to a LAN.

A modem 55 provides subscriber line interface functionality for the subscriber line interface 31. The modem uses a digital stream service, for example ADSL.

There is also a telephony application 52. Further there is one or more application handlers 56 such as for example an e-mail polling application.

Addressable units in the network terminal can communicate by using the multiplexing and transport capabilities of IP, as symbolized by an IP multiplexor/demultiplexor 57.

Refer to FIG. 10. The telephony server 9 comprises a telephony application 67. This telephony application 67 is intended to communicate with a telephony application 52 in the NT 28 and create a relation (call) between instances in both entities, i.e. the telephony applications 52, 67 handle the relations between telephone numbers or equivalent and local addresses and port numbers for the telephony applications. The telephony applications 52, 67 also handle the telephony signalling, i.e. handle the service specific protocols, e.g. control protocols for telephony.

More in detail, FIG. 10 illustrates how the access network handles the telephony application. The basic principle is that the internal communication, to/from the telephony server 9 from/to the NT 28, is performed by IP. Accordingly, the system provides an IP domain 58, in which several units communicate by IP. It may also be noted that the entire communication takes place on a level above the modem and link protocols.

A telephony application 67 in the telephony server 9 communicates with PSTN 2. This is preferably done using conventional protocols for control signalling 72a and speech transferring 72b. The telephony application 67 in the telephony server 9 also communicates with a telephony application 52 in the NTs 28 by an internal application specific protocol, which e.g. can be V5.2 or another protocol for telephony. In this communication, speech is controlled by a speech handling protocol 71, 62 and a UDP (User Datagram Protocol) 69, 60 in both the telephony server 9 and the NTs 28 and the resulting packages are communicated by the IP domain 58. In parallel, control signalling is handled by a control protocol 70, 61 and a TCP (Transmission Control Protocol) 68, 59 above the IP domain 58.

The telephony application 52 in the NT 9 is in its turn communicating with a connected telephone 5 and users using them, using an analogue traditional protocol for telephony 63, via e.g. an analogue telephone interface. Also here speech and control signalling are separated, the speech using a UDP 64d and a CODEC 65, while the control signalling is using a TCP 65 and control protocol 66. There are also possibilities to handle the communication between the telephone application 52 and the respective interfaces in NTs 28 in other ways than with IP 58, but IP 58 is presently considered as the most preferable solution.

Refer to FIG. 11. The IP router 8 comprises an IP application 81. This IP application is intended to handle the relations between external IP addresses or equivalent and local addresses and port numbers for the IP applications.

FIG. 11 illustrates how the access network works with the IP applications 81, 79. In this example, the address mapping between external and internal addresses (described further below) in the case of IP communication can be solved by e.g. using tunnelling, which by itself is known in the art. There are several known tunnelling protocols 83, 82, and the procedure to establish a tunnel between the router 8 and the PC 6 and will therefore not be further described in detail. In this case, however, a tunnel is a mechanism to convey IP packets between two points by means of IP as a transport protocol 58. IP packets are thus conveyed as data in other IP packets. The address spaces are different between the two layers of IP. Generally, the lower IP layer 58 is associated with internal IP addresses, while the upper IP layers 79, 81 are associated with external IP addresses. In cases where the communication is to be terminated in the NT 28, there are also (not shown) corresponding tunnelling protocols and IP available. This may be useful, for instance, when a user via an analogue telephone wants to have access to the Internet phone capabilities.

Alternatives

In the above description IP is used as a multiplexing technique in the access network. IP packets are also exchanged between the IP access server and the IP router and between the IP access server and the telephony server. In the alternative the IP packets are provided with a header in accordance with the tag switching protocol. This is done at the IP router, at the telephony server and at the network terminals. The IP packets will now be transported using tag. In the IP access server the tag packets are multiplexed, now using tag as multiplexing technique. The tag packets are transported in accordance with the tag protocol or in a customized protocol., Above the invention has been described in connection with PSTN. In the alternative ISDN is used. Also, the invention has been described in connection with Internet. In the alternative an Intranet or any based IP network can be used in conjunction with the present invention.

In a typical installation the network terminal would be a card sitting in a small housing mounted at a wall of the user's premises in the vicinity of the incoming subscriber line 13.

If ADSL is used as modem technology bit streams in the order of 8 Mb/s downstream and at least 500 Mb/s upstream is available for a twisted pair copper subscriber line length up to about 6 km. Still higher bit rates are available if the subscriber line is shorter. If VDSL is used bit rates in the order of 20 Mb/s in both directions over a copper pair subscriber line 13 length up to a few hundred meters are attained. So, by physically arranging the IP based access node 10 at a proper distance from the network terminal 15 bandwidths in the indicated ranges are available. The IP based access node 10 so located will act as a kind of remote switch group to a central office in PSTN 2.

As a modification of the telephony application the following is possible: If there is an incoming call to telephone 5 and no one answers the call, the application is designed to send ring signals to the telephones connected to the second telephone interface. If the call now is answered, then the telephony application internally redirects the call to the second interface.

In the alternative the telephony application can de designed to send ringing signals to all of the telephones 5, 36, 37 when there is an incoming call that as destination has both the first telephone interface or the second telephone interface.

Telephony interfaces 29 and 34 have been shown as traditional analogue telephony interfaces. Of course many other conventional telephony interfaces can be used, such as for example a DECT interface (Digital European Cordless Telephony). Instead of analogue telephones 5, 36, 37 digital telephones can be used. Such digital telephones can also be connected to a home LAN connected to terminal equipment interface 35 or to the telephony interfaces 29, 34, although they cannot be cascade connected as analogue telephones. If connected to the interfaces 29, 34 the analogue telephony protocol has to be replaced with a conventional digital telephony protocol.

In FIGS. 4 and 5 the access node 24 is shown to be an integral unit. It may as well be embodied as a distributed unit.

In FIGS. 4 and 5 the telephony server 9 serves one IP access server 32. It is also possible to let one telephony server 9 serve several IP access servers.

In FIGS. 4 and 5 the IP router serves one IP access server 32. It is also possible to let the IP router serve many IP access servers.

In FIGS. 4 and 5 there is just one IP router connected to the Internet. It is also possible to have many IP routers connected to an IP based network over an intermediary network.

In FIGS. 4 and 5 there is just one telephony server connected to the PSTN. It is also possible to have many telephony servers connected to PSTN over an intermediary network.

In FIGS. 4 and 5 there is just one telephony server connected to an IP access server. It is also possible to have many IP access servers connected to the telephony server.

The network terminal can have at least one external IP adress thus allowing the network terminal to communicate externally on its own.

What is claimed is:

1. An access network comprising a number of subscriber lines, at least one network terminal, a network node, a high speed modem provided at the subscriber line interface of each network terminal and a corresponding number of corresponding high speed modems provided at access line interfaces of the IP access server, wherein each network terminal has a subscriber line interface and at least one interface connecting a subscriber communication facility, and the network node has a telephony network interface, an IP access server, an IP router that is connected to the IP access server and that has an IP network interface, and a telephony server connected to the IP access server and to the telephony network interface, the at least one network terminal being connected to the IP access server at at least one access line interface provided in the IP access server, and each one of the high speed modems providing high bit rates from about 140 Kbps to about 20 Mbps and above using an xDSL protocol selected from the group comprising a DSL protocol, a HDSL protocol, a VDSL protocol, an ADSL protocol, an SDSL protocol.

2. The access network of claim 1, wherein the IP access server comprises a high speed modem providing high bit rates from about 100 Kbps to about 20 Mbps and above.

3. The access network of claim 1, further comprising an IP multiplexor having several inputs and one output, the network terminals being connected to the inputs over respective subscriber lines and the output being connected to the IP access server.

4. The access network of claim 3, further comprising a high speed modem provided at the subscriber line interface of each network terminal and a corresponding number of corresponding high speed modems provided at the inputs of the IP multiplexor, each of the high speed modems providing high bit rates from about 140 Kbps to about 20 Mbps and above using an xDSL protocol selected from the group comprising a DSL protocol, a HDSL protocol, a VDSL protocol, an ADSL protocol, and any future high speed digital subscriber line protocol.

* * * * *